H. D. HAPEMAN.
ATTACHABLE TRACTOR FOR AUTOMOBILES.
APPLICATION FILED FEB. 16, 1917.

1,238,762.

Patented Sept. 4, 1917.
2 SHEETS—SHEET 2.

Witnesses:

Inventor.
Harry D. Hapeman.

UNITED STATES PATENT OFFICE.

HARRY D. HAPEMAN, OF LA GRANGE, ILLINOIS.

ATTACHABLE TRACTOR FOR AUTOMOBILES.

1,238,762.  Specification of Letters Patent.  Patented Sept. 4, 1917.

Application filed February 16, 1917. Serial No. 148,954.

*To all whom it may concern:*

Be it known that I, HARRY D. HAPEMAN, a citizen of the United States, residing at La Grange, in the county of Cook and State of Illinois, have invented certain new and useful Improvements in Attachable Tractors for Automobiles, of which the following is a specification.

My invention relates to attachable tractors for automobiles.

One of the objects of my invention is to provide an attachable tractor, of preferably caterpillar type, for automobiles, adapted for association with such vehicles without the necessity of removing any of the parts thereof, whereby to readily and quickly adapt an automobile to agricultural uses and other such purposes.

Another object of my invention is to provide a self-contained tractor structure, comprising two spaced-apart tractor units held together by an intermediate frame or connector, which is capable of ready attachment to the rear axle of an automobile. Each said tractor carrying one or more trains of speed-reducing trains of gearing to drive the tractor. Said tractors being attachable to the rear wheels of the vehicle, which are not disturbed when the tractor attachment and automobile are operatively associated or bodily separated.

Other and further objects of my invention will become readily apparent, to persons skilled in the art, from a consideration of the following description when taken in conjunction with the drawings, wherein:—

In all the views the same reference characters are employed to indicate similar parts.

Figure 1:
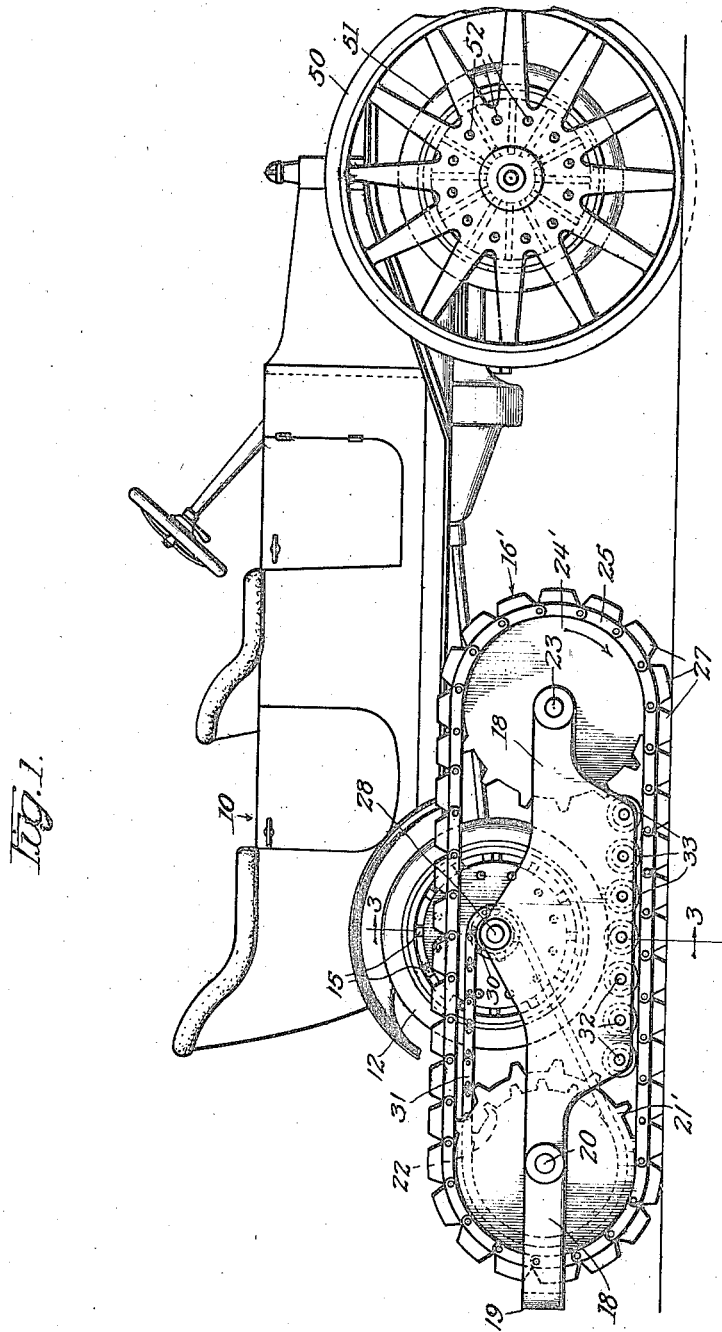
Figure 1 is a side elevation of a typical automobile showing my tractor attached thereto.
Figure 2:
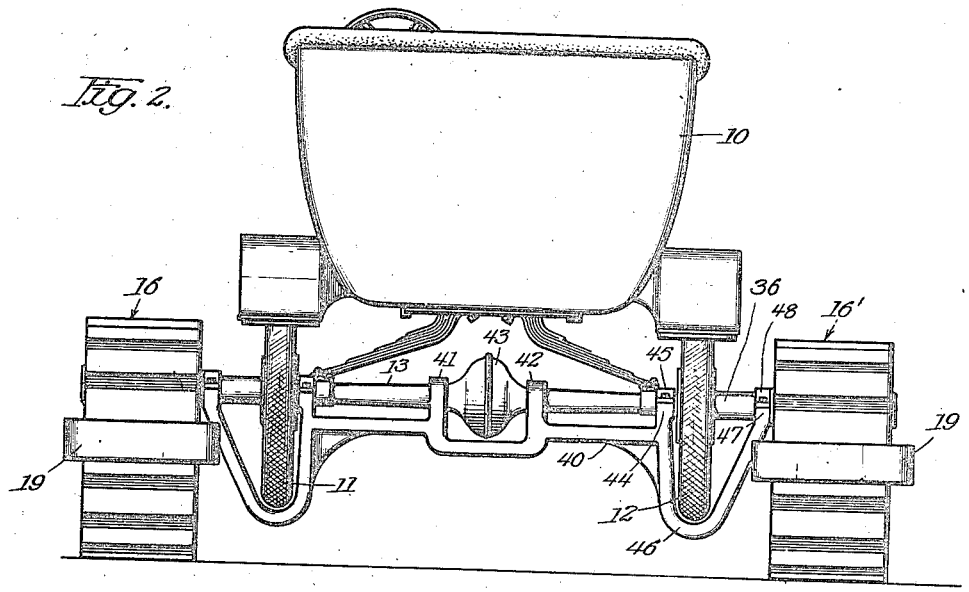
Fig. 2 is a rear view of the same.
Figure 3:
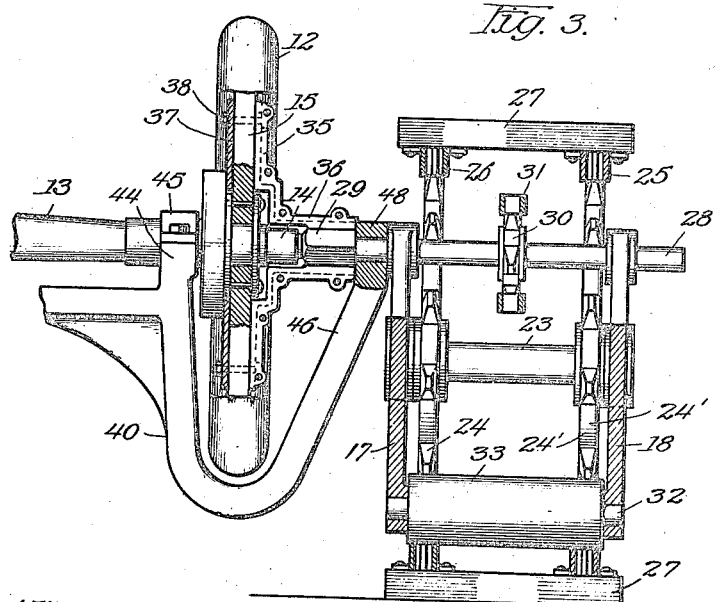
Fig. 3 is a transverse section of one tractor unit and a rear driving wheel of the car showing the manner of attachment.

10 is an automobile having rear driven wheels 11 and 12 supported on the rear live axle at the outer ends of the fixed axle 13. These wheels are provided with the usual hubs 14 and spokes 15. The rear axle casing 13 is relatively stationary and contains a driven or live axle therein. This two part driven or live axle is connected to the wheels 11 and 12, as usual in automobiles.

Each tractor unit 16 and 16' contains two side frame members or plates 17 and 18. These members are preferably joined together at the rear by a cross beam or portion 19. Journaled in the rear portions of the members 17 and 18 is a shaft 20 which carries a pair of spaced apart sprocket wheels 21'—21' and another driven sprocket wheel 22. Journaled in the forward end of the frame composed of the frame members 17 and 18, is a transverse shaft 23 which carries a pair of spaced-apart sprocket wheels 24 and 24'. These wheels are spaced apart the same distance as are the wheels 21'—21'. A chain 25 passes over the alining sprocket wheels 21' and 24' and a chain 26 passes over the alining sprocket wheels 21' and 24. At suitable intervals traction shoes 27 are cross connected to the links of the chains to afford bearing surfaces for the tractor belt. When the tractor belt thus made is moved in the direction of the arrow shown in Fig. 1, the vehicle is propelled forwardly. Journaled at a point substantially central of the shafts 20 and 23, and in a horizontal plane above, is another shaft 28, which terminates on its inner end in a squared or angular head 29. This shaft I call an extension axle because it is to be located in the axial plane of the automobile driving axle. This shaft or axle carries a relatively small sprocket wheel 30, which is connected by a chain 31 to the relatively larger sprocket wheel 22, the latter being secured to the shaft 20. By this means the tractor belt 37 is propelled at a speed-ratio considerably less than would result if the shafts 20 and 23 were directly connected to or driven by the automobile axle without the speed reducing connection. Extending transversely of the frame members, 17 and 18, and having their ends secured therein are preferably stationary shafts 32, spaced apart and each carrying a roller 33. The rollers are in practically a horizontal line and afford abutments for the upper surfaces of the lower flight of the tractor belt, when in contact with the earth, or roadway over which the machine is being propelled. The rollers reduce, or substantially eliminate, the friction which would be otherwise produced by the upper surfaces of the belt in contact with the relatively immovable surfaces of the frame.

Now it will be manifest, from the foregoing description, that when the live axle of the automobile is rotated the tractor belt or caterpillar will thereby be driven to propel the vehicle over the roadway.

A member, for attachment to the automobile wheels 11 and 12, for driving the respective tractors 16—16', consists of a disk 35, axially extended into a hub 36, which is hollowed out to admit the hub 14 of the automobile wheel 11 or 12. The extended end of the hub 36 is provided with a square or angular socket to admit the head 29 of the shaft or extended axle 28, so to positively drive the shaft 28 when the automobile wheel is rotated. This attaching member is secured to the wheel by means of a disk 37, located on the opposite side of the spokes 15 of the wheel and fastened thereto by a plurality of bolts 38. The disk 37 and the member 35 may each be made in two parts, so as to be readily placed upon the wheel without removing the wheel from the axle of the automobile to apply the tractor.

The two tractor units, 16—16', are connected together by a frame, or casting 40, which is provided with two like ends. The central portion is provided with two upwardly extending forked parts 41 and 42, for supporting the stationary axle 13, on each side of the differential, gear casing 43, and another portion 44 for supporting the axle just inside the automobile traction wheels provided with a cap 45 for securing the frame in contact with the stationary axle and having a portion 46 extending down and around the wheels 11 and 12. The upper, outer end of the casting 40, as at 47, extends around the inner end of the shaft 28 and is secured in place by a cap 48, serving as an out board bearing. This portion 46, serves to support the extension shaft beyond the traction wheels 11 and 12 and it also permits the traction wheels to be rotated when the engine of the vehicle is operated and thereby to serve as fly wheels for driving the respective tractors.

To remove the vehicle from the pair of tractors, joined together by the cross connector 40, it is only necessary to take off the caps 45 and 48 and remove the clamping members 35 and 37 and lift the automobile free of the tractor mechanism. This leaves each of the tractor units 16—16' unchanged, with reference to its mechanism, so that it is only necessary to connect or disconnect the attaching parts from the automobile to associate and disassociate the two instrumentalities.

It may be necessary to raise the front end of the automobile to the same extent as the rear end is raised when my pair of tractors are placed thereunder. I therefore provide for the front end tractor wheels 50, which may be of cast iron, or the like, and which are secured to the front wheels 51 of the automobile by being bolted between the spokes of said wheel, as at 52, into a two-part plate, similar to plate 37, located on the inside of the wheel.

It will of course be understood that the same controlling and guiding mechanism employed for the automobile may be used when my tractor units are connected thereto.

While I have herein shown a single embodiment of my invention, for the purpose of clear disclosure, it will be manifest, to persons skilled in the art, that many changes in the configuration and disposition of the parts may be made, within the scope of the appended claims.

Having described my invention, what I claim is:—

1. A tractor for attachment to a power driven vehicle having a frame and driven axle, said tractor comprising an extension shaft coaxial with an end of the driven axle, means connected with the vehicle for supporting the shaft, a connection between the shaft and axle, a tractor frame journaled on the shaft, an endless link belt carried by the tractor frame, and a driving connection between the link belt and shaft.

2. A tractor attachment for a power driven vehicle having a driven axle, an axle housing, and wheels on the ends of the axle, said attachment comprising a frame connected with the axle housing and projecting axially beyond the wheels, extension shafts coaxial with the driven axle and journaled in the ends of the frame, means connecting the wheels with the shafts, tractor frames journaled on the shafts, an endless link belt in each tractor frame, and driving connections between the shafts and link belt.

3. A pair of organized caterpillar tractors, each comprising two frame plates; a pair of spaced-apart sprocket wheels rotatably supported in each end of the frame; a pair of tractor chains having tractor shoes secured thereto, supported on said wheels; an extension axle, located in said frame between said pairs of sprocket wheels, upon which the tractor is pivoted; means to connect said extension axle to the driving axle of an automobile, and a frame for supporting the rear end of the automobile with its wheels free of the ground, and for holding said tractors in spaced-apart relation.

4. A pair of organized caterpillar tractors each comprising two frame plates; a pair of spaced-apart sprocket wheels rotatably supported in each end of the frame; a pair of tractor chains having tractor shoes secured thereto at intervals, supported on said wheels; an extension axle, located in said frame between said pair of sprocket wheels, upon which the tractor is pivoted; a speed-reducing driving means connecting one pair of said sprocket wheels with the said extension axle; means to connect the said extension axle to the driving axle of an automobile and a frame for supporting the rear end of an automobile with its wheels free of the ground, and for holding the said tractors in spaced-apart relation.

In testimony whereof I hereunto set my hand in the presence of two subscribing witnesses.

HARRY D. HAPEMAN.

In the presence of—
   EDGAR HAPEMAN,
   FORÉE BAIN.